United States Patent [19]

Schulte

[11] Patent Number: 5,014,391
[45] Date of Patent: May 14, 1991

[54] LOCKABLE CASTER WHEEL

[76] Inventor: Arnolf Schulte, Friedenstrasse 8C, 5632 Wermalskirchen, Fed. Rep. of Germany

[21] Appl. No.: 464,251

[22] Filed: Jan. 12, 1990

[30] Foreign Application Priority Data

Jan. 13, 1989 [DE] Fed. Rep. of Germany ....... 3900889

[51] Int. Cl.$^5$ .............................................. B60B 33/06
[52] U.S. Cl. ........................................ 16/35 R; 16/44
[58] Field of Search ................. 16/35 R, 44; 188/1.12

[56] References Cited

U.S. PATENT DOCUMENTS 4,773,124  9/1988  Nakao et al. ...................... 16/35 R

FOREIGN PATENT DOCUMENTS

3602916  6/1987  Fed. Rep. of Germany.
3612925 10/1987  Fed. Rep. of Germany.

Primary Examiner—Richard K. Seidel
Assistant Examiner—Carmine Cuda
Attorney, Agent, or Firm—Sughrue, Mion, Zinn, Macpeak & Seas

[57] ABSTRACT

A lockable caster wheel, in particular for movable hospital beds, has a fastening pin (1) and a swivel arm (8) which is positioned in a swivel bearing (7) with respect to said fastening pin. A wheel carrier (10), which bears at least one wheel (13), can swivel at the swivel arm (8) and is braced in a flexible manner via a wheel spring (20) against said swivel arm. A locking bolt (21), which is arranged coaxially to the fastening pin (1) and can be moved in the axial direction relative to said pin against the action of a lift spring (25) bears a brake lever (33), which blocks the wheel (13), and a mechanism for locking the swivel motion of the swivel arm (8), which encloses a locking disk (38a). The flexible axle (11) of the wheel carrier (10) runs parallel to the axis of rotation of the wheel (13) and intersects the longitudinal axis of the locking bolt (21). The brake lever (33) can be tilted in the wheel carrier (10) parallel to the flexible axle (11). The vertical position of the contact point between the bottom end of the locking bolt (21) and the brake lever (33) is independent of whether the wheel carrier (10) is in the spring loaded or non spring loaded state. This enables both the blocking of the wheel (13) and the locking of the swivel motion of the swivel arm by means of an eccentric disk (27), which moves the locking bolt (21) axially.

27 Claims, 4 Drawing Sheets

LOCKABLE CASTER WHEEL

BACKGROUND OF THE INVENTION

The invention relates to a lockable caster wheel, in particular for movable hospital beds, with a fastening pin; a swivel arm, which can be swivelled around the fastening pin in a swivel bearing; a mechanism for fixing the swivelling motion of the swivel arm and at least one rotatable wheel, moreover with a tiltable brake lever to block the rotation of the wheel, and a locking bolt that is arranged coaxially to the fastening pin and, relative to said pin, can be moved in the axial direction against the action of a spring and that locks the swivel arm as a function of its axial position and/or blocks the wheel by means of the brake lever.

Such a caster wheel is known from the DE-OS No. 36 02 916. The fastening pin serves the purpose of mounting the caster wheel to a tubular foot, for example a hospital bed. In the prior art caster wheel the locking bolt can be moved axially but due to its hexagonal cross section, cannot be rotated in the fastening pin. At its bottom end the locking bolt has a disk washer that is moulded on and that has on its bottom side a toothing. A wheel fork that can be swivelled around the fastening pin guides a rotatable wheel. A brake arm can be swivelled below the back of this wheel fork. The toothing at the disk washer of the locking bolt can be meshed with a tooth segment that is fastened to the brake arm. If the locking bolt is forced into its bottom end position opposite the action of a compression spring by means of a cam disk, the toothing of the disk washer meshes with the tooth segment of the brake arm and presses it firmly on the tread on the wheel. In addition to the braking of the wheel, this meshing of the toothing also enables the blocking of the adjusted swivel position of the wheel fork with respect to the fastening pin. In this manner, the wheel is blocked from both swivelling and rotating. If the locking bolt is under the pressure of the compression spring in its upper end position, the wheel for locks in a snap-in position, which corresponds to setting the wheel straight ahead. This ability to fix the direction is especially advantageous for movable hospital bed in order to be able to move them straight ahead for long distances without having the wheels swivel in an undesired manner. If the locking bolt is located in an intermediate position between the bottom and upper end position, the wheel can be rotated freely and the wheel fork can be swivelled unimpeded around the fastening pin. The bed can then be moved freely in all conceivable directions.

The drawback with the prior art caster wheels that can be locked with respect to the swivel and rotary motion of the wheel is that they cannot absorb shocks. However, especially in the case of hospital beds there is a need to use an elastic caster wheel to absorb shocks from uneven surfaces when moving over said surfaces.

From the DE-OS No. 36 12 925 an elastic caster wheel is already known that has a swivelling swivel fork, a wheel fork, which can be tilted therein parallel to the axis of the roller wheel, for the caster roller wheel and a wheel fork spring that is arranged between said caster roller wheel and the swivel fork. The prior art caster wheel can absorb shocks but it offers no possibility of locking the swivel motion and/or blocking its rotation.

SUMMARY OF THE INVENTION

The object of the invention is to provide a caster wheel in which not only the swivel motion of the wheel can be locked and its rotation can be blocked but also, in addition, it can absorb shocks.

In solving this technical problem one starts with a lockable caster wheel of the aforementioned kind. The problem is solved in that a wheel carrier, which bears the wheel, can be swivelled at the swivel arm, in that the flexible axle of the wheel carrier travels essentially parallel to the axis of rotation of the wheel and intersects the longitudinal axis of the locking bolt, in that, furthermore, the brake lever is mounted in the wheel carrier, in that the axis of tilt of the brake lever is parallel to the flexible axle of the wheel carrier, and in that the wheel carrier is braced in a flexible manner against the swivel arm by means of a wheel spring.

With non-shock absorbing caster wheels known from prior art with locking mechanism there is no problem in actuating the brake lever by means of the locking bolt that is arranged coaxially to the fastening pin and can be moved axially with respect to said fastening pin in order to block the rotation of the wheel. The brake lever has a position, which is clearly defined in the vertical direction, relative to the fastening pin, since the swivel arm and the brake lever mounted thereon can be shifted exclusively in the horizontal direction. To ensure at this stage a reliable blocking of the rotation of the wheel both in the spring-loaded and non-spring-loaded state, in the case of the caster wheel of the invention the brake lever is mounted in the shock absorbing wheel carrier, which bears the wheel. To ensure that the brake lever can still be actuated by a constant lift with respect to the fastening pin by means of an axial shifting of the locking bolt, the flexible axle of the wheel carrier, runs, according to another important feature of the invention, parallel to the axis of the wheel and intersects the longitudinal axis of the locking bolt. The contact point between the locking bolt and the brake lever, which lies automatically also on the longitudinal axis of the locking bolt, remains thus independent of the swivelling motions of the wheel carrier. Since the lift by which the locking bolt must be shifted to block the rotation of the wheel, thus is always the same in the spring-loaded and non-spring-loaded state, an additional mechanism for locking the swivelling motion of the swivel arm around the fastening pin, which is also actuated by means of an axial movement of the locking bolt, can be integrated into the caster wheel designed according to the invention without any difficulty.

Thus, the caster wheel, proposed with the invention, has not only the known advantages of being able to lock the swivelling motion and to block the rotation of the wheel by means of one single central locking bolt but also the advantage that the wheel is cushioned.

In another embodiment of the caster wheel of the invention the wheel bears a brake rim that is arranged coaxially around its hub and the brake lever is designed as a two-armed lever, whose one end bears a brake member that interacts with the brake rim and whose other end interacts with the bottom end of the locking bolt. The two-armed brake lever represents a transfer element between the locking bolt and the brake member. In this manner an axial movement of the locking bolt leads to an opposing motion of the brake member to or away from the brake rim.

Preferably the wheel carrier has at least one axle journal to receive the hub of the wheel. Two wheels can also be at short intervals from one another on the wheel carrier. Such double rollers distribute the movable load on a correspondingly enlarged vertical wheel surface. Thus, a design is preferred in which the axes of rotation of the two wheels are tilted downward forming an acute angle. The resulting negative camber of the wheels improves the steerability.

In a preferred embodiment of the caster wheel of the invention the wheel spring, which cushions the wheel carrier with respect to the swivel arm, is designed as a spiral spring. However, the wheel spring can also be designed as a leaf spring or a torsion-bar spring. A spring housing, which is part of the swivel arm, can accommodate and protect the wheel spring.

In another embodiment of the invention the wheel carrier is designed as a one-armed lever, the free end of the wheel carrier has a spring washer to receive the bottom end of the wheel spring and the axis of rotation of the wheel lies between the flexible axle and the wheel spring. This design and mounting of the wheel carrier has the advantage that it can be cushioned by means of a single wheel spring.

A wheel carrier, whose one end can be swivelled, and which, with its other end is braced against the non-cushioned swivel arm by means of the wheel spring, forms with the wheel spring a right angle only in one specific load state. Therefore, in another preferred embodiment of the caster wheel of the invention, the wheel carrier has a journal pin, which extends parallel to the flexible axle of the wheel carrier, a spring bracket can be tilted on said journal pin, the spring washer is designed on the upper side of said spring bracket to receive the bottom end of the wheel spring. Even when the wheel carrier is moved out of the horizontal plane, the spring bracket, that, in turn, can be tilted relative to the wheel carrier, remains always in an upright position that coincides with the longitudinal axis of the wheel spring. It is, thus, always loaded in the longitudinal direction. A guide cylinder, which is also provided at the spring bracket, for the wheel spring prevents said spring from jumping out of the spring washer.

In a preferred embodiment of the invention the device for locking the swivelling motion of the swivel arm is realized in that the locking bolt has a multi-edged cross section, that the fastening pin has an axial bore corresponding to the cross section in which the locking bolt is guided stationarily, that a toothed rim is designed at the swivel arm, that a locking disk, which has a toothing on its bottom side, is connected stationarily to the locking bolt, that, furthermore, this locking disk meshes with the toothed rim subject to the action of the locking spring in order to thus lock the swivelling motion of the swivel arm around the fastening pin, and finally in that the locking bolt bears a cam plate, which lifts the locking disk upward from the toothed rim when the locking bolt is moved axially. As already stated, the rotation of the wheel is blocked by an axial movement of the locking bolt around a lift, which is independent of the swivelling position of the cushioned wheel carrier relative to the swivel arm. This makes it possible to exploit the fact that the locking bolt can move axially in the conventional manner also to lock the swivel motion of the swivel arm around the fastening pin. To this end, a corresponding axial shifting of the locking bolt causes the locking disk that is connected stationarily with said locking bolt to mesh with the toothed rim designed on the swivel arm. When the locking bolt is moved axially in the opposing direction, the cam plate provided on the locking bolt, lifts the locking disk again from the tooth rim, thus restoring the ability of the swivel arm to swivel with respect to the fastening pin.

In addition to the total locking of the swivelling motion of the swivel arm at any arbitrary angle, it is desirable to be able, independently thereof, to lock the wheel at any specific angle, in particular in a straight ahead position. This goal is attained in a preferred embodiment of the lockable caster wheel, which is characterized in that the locking disk can be moved axially relative to the locking bolt, that at the swivel arm above the toothed rim a stop rim is designed whose diameter is greater than that of the toothed rim, that a stop disk is connected stationarily yet axially movable to the locking bolt above the locking disk, and that said locking disk has notches on its bottom side and whose diameter is greater than that of the locking disk, that this stop disk can mesh with the stop rim subject to the action of the stop spring, in order to thus lock the swivel arm with the fastening pin in the straight ahead position of the wheel, that furthermore, the locking spring is arranged between the upper side of the locking disk and the bottom side of the stop disk, and that the spring force is greater than that of the locking spring. In this construction of the locking mechanism the locking bolt is enclosed concentrically by two superposed disks of which the upper disk causes the swivel arm to lock only when the wheel is in the straight ahead position, whereas the bottom disk enables a complete locking of the swivel arm in any arbitrary angular position.

The function of the two coaxially superposed disks can also be interchanged so that the upper disk acts as the locking disk and the bottom disk acts as the stop disk. In this alternative embodiment of the locking mechanism the upper locking disk must be securely connected to the locking bolt not only radially but also axially. Moreover, the construction corresponds to the above described design.

Preferably the upper side of the stop disk or the locking disk is designed as the spring washer to receive the stop spring or the locking spring. Furthermore, the bottom side of the stop disk or locking disk can have a ring groove, which brings about a centering of the locking spring or the stop spring.

It should be possible to replace caster wheels with a few manipulations. This requirement is especially difficult to fulfill when, as in the case of current sick beds, the locking of the swivel and rotary motion of the wheels of all four rollers is actuated centrally by means of linkages. Therefore, in the preferred embodiment of the lockable caster wheel provided with the invention, a receiving space is designed in the upper part of the fastening pin, in this receiving space an eccentric disk can be rotated vertically to the longitudinal axis of the locking bolt and this eccentric disk moves the locking bolt out of its upper resting position axially downward. The integration of this eccentric disk into the upper part of the fastening pin permits the pre-assembly of the actuating mechanism for the locking bolt. Similarly it is possible to replace a caster wheel without disassembling the bed side switching linkages. To assemble or disassemble only the connections between the eccentric disks of the caster rollers and the actuating linkages need to be disconnected or restored.

To compensate for any clearance that might be present between the locking bolt and the tiltable brake lever and to prevent any damages to this brake rim, it is desirable that the brake lever be pressed elastically against the brake rim. In an espeically preferred embodiment of the caster wheel of the invention, an elastic intermediate element is, therefore, arranged between the locking bolt and the eccentric disk. The eccentric disk does not act directly but rather over an axially movable pressure segment on this elastic intermediate element. The locking bolt bears on its upper end a head plate on whose upper side rests the elastic intermediate element. Head plate, intermediate element and pressure segment can move in the axial direction in a cylindrical recess, which is designed around the upper end of the locking bolt in the fastening pin. A corresponding twisting of the eccentric disk moves the locking bolt axially into its upper end position, the brake member of the brake lever engaging with the brake rim of the wheel. If the brake member does not lock immediately with the brake rim, the resulting, somewhat shortened path of the locking bolt is compensated for by the elasticity of the elastic intermediate element. If the wheel rotates just slightly, the brake member is completely locked into the brake rim, the locking bolt travelling the last short distance into its upper end position. Similarly the elastic intermediate element prevents an undesired unlocking of the brake member out of the brake rim even if, for example, the position of the brake lever or the eccentric disk exhibits a certain play.

The eccentric disk exhibits in an advantageous manner on its periphery three bearing regions for three defined axial positions of the locking bolt. The first bearing region having the smallest diameter corresponds to the upper end position of the locking bolt in which the wheel can be rotated and swivelled. The center bearing region, which has a larger diameter with respect to the first bearing region, corresponds to an axial intermediate position of the locking bolt in which the swivel arm can be swivelled only to a limited degree around the fastening pin, until the wheel is locked in the straight ahead position. If the eccentric disk, which has the largest diameter, comes to rest, the locking bolt assumes its bottom end position in which both the swivel motion of the swivel arm is locked with respect to the fastening pin and the rotation of the wheel is blocked by means of the brake lever.

A design that has withstood the test quite well is one in which the spring, which acts upon the locking bolt, encloses said bolt concentrically and is clamped between the bottom side, its head plate and the bottom of the recess provided in the upper part of the fastening pin. The result is a force direction of the spring, which tries to push the locking bolt upward. If the locking bolt, starting from its upper end position, is moved axially downward by twisting the eccentric disk, it must occur against the increasing force of this spring.

The caster wheel can be readily pushed from the bottom into a base tube of a hospital bed, when the fastening pin comprises a one-piece bearing sleeve, which contain eccentric disk, and a guide piece in which the locking bolt is guided. The caster wheel, which is pushed into a base tube of the bed with its bearing sleeve, can be fastened with a single fastening screw, which penetrates the base tube and the bearing sleeve and thus fixes in their position relative to one another the bearing sleeve, guide piece, and base tube.

It is not always necessary that a caster wheel offer, in addition to the total locking of the swivel motion, also the possibility of locking the wheel at a preferred angle, thus example in the straight ahead position. For many applications it suffices if the swivel motion can be locked into any arbitrary angle and, in addition, the wheel can be blocked. From the point of view of cost, the use of a simple friction bearing as the swivel bearing can be used instead of an expensive ball bearing. Therefore, the invention also includes a simpler design of an elastic, lockable caster wheel. This is characterized in that the swivel arm can be moved axially with respect to the fastening pin, that the spring is arranged between the fastening pin and the swivel arm, that a toothed ring is provided on the bottom end of the fastening pin, that, furthermore, the upper end of the swivel arm bears a counter toothing, which meshes with the toothed ring against the action of the spring, in order to thus lock the swivel motion of the swivel arm around the fastening pin, and that the locking bolt is arranged within the swivel arm. Even in this simpler caster wheel one important feature is that the flexible axle of the non-spring loaded wheel carrier intersects the longitudinal axis of the locking bolt so that the contact point between the locking bolt and the brake lever is independent of a vertical swivelling of the wheel carrier with respect to the swivel arm. This geometry makes it possible to provide a single common locking mechanism to lock the swivelling motion of the swivel arm and to block the rotation of the wheel.

A preferred embodiment of this simpler caster wheel is characterized in that the wheel bears a brake rim arranged coaxially around its hub, that the brake lever is designed as a two-armed lever, whose one end bears a brake member interacting with the brake rim and whose other end interacts with the bottom end of the locking bolt, that a rotary eccentric can be rotated at the wheel carrier parallel to the axis of tilt of the brake lever, and that this rotary eccentric acts on the brake lever in the vicinity of the brake member. The two-armed brake lever transfers not only the force generated by the rotary eccentric on the brake member but also has here simultaneously the function of a transfer lever, which moves the locking bolt axially upward with its opposing end as a function of the position of the rotary eccentric.

Another design that has also proven itself is one in which the brake lever has a shoulder in the region of its end bearing the brake member. The cams of the rotary eccentric can thus make contact with the shoulder.

To actuate, the rotary eccentric is preferably connected to a foot lever. When this foot lever is pressed down—via the axial movement of the locking bolt—the swivel arm is locked first and blocks also the rotation of the wheel—by means of the brake member—when said foot lever is further depressed.

To always ensure that the wheel is reliably blocked, the locking bolt can be moved axially within the swivel arm and can be subject to the action of an elastic intermediate element. The force-storing action of this elastic intermediate element provides that the brake member, arranged at the brake lever, comes to rest on the brake rim on the wheel with the spring pressure. In addition, any possible slackness of the brake lever can be compensated for. A receptacle for the upper end of the locking bolt can be designed in the interior of the swivel arm, wherein it is expedient that the elastic pressure piece be arranged between this receptacle and the locking bolt.

BRIEF DESCRIPTION OF THE DRAWINGS

Two embodiments of the invention are explained in detail with reference to the attached drawings, wherein.

DETAILED DESCRIPTION OF THE INVENTION

Figure 1:
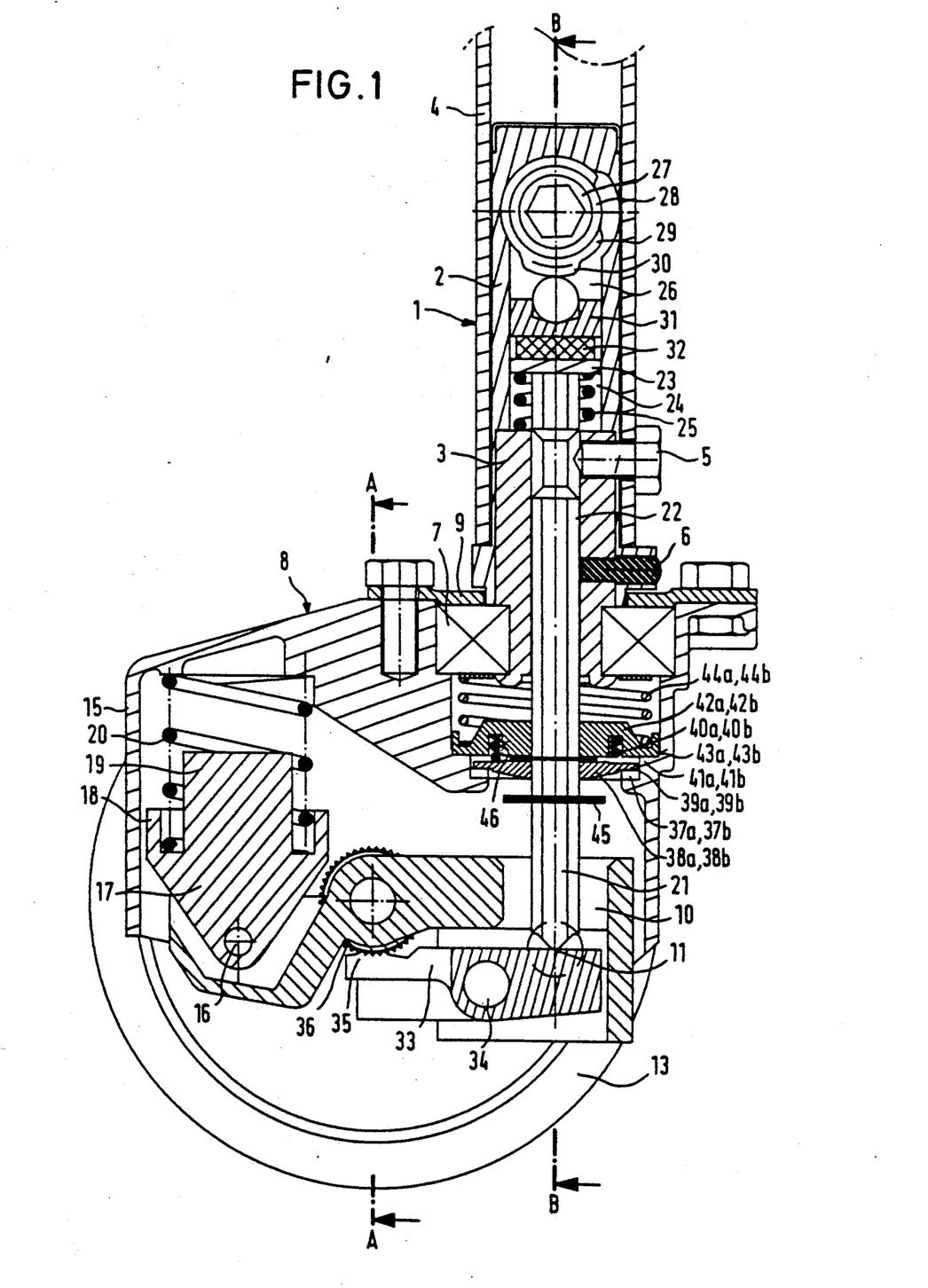
FIG. 1 is a vertical section of a first embodiment of a lockable caster.
Figure 2:
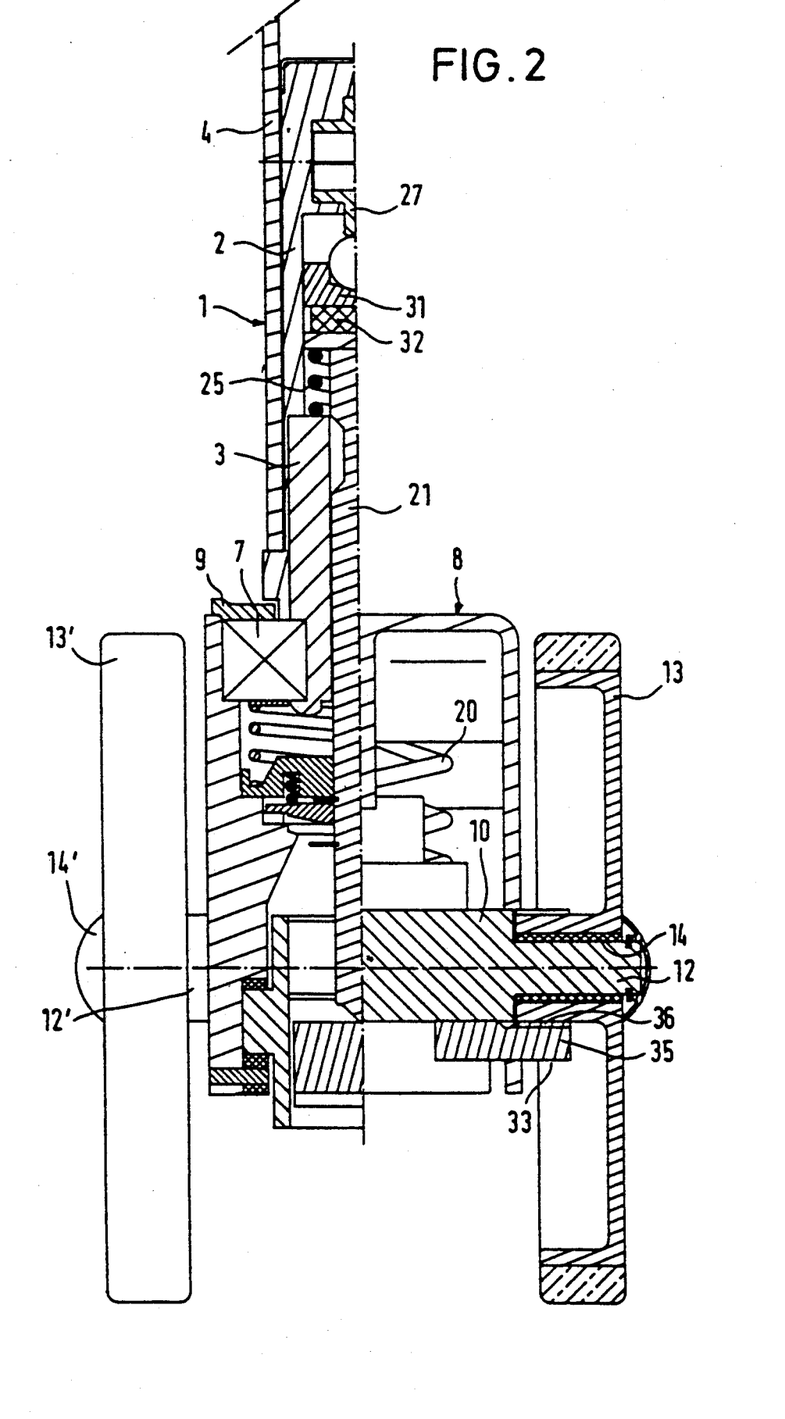
FIG. 2 shows on the right a vertical section of a caster wheel of FIG. 1 taken along line A—A and on the left a vertical section along the line B—B.

The caster wheel shown in FIGS. 1 and 2 has a fastening pin 1, which is designed as two parts and comprises a cylindrical bearing sleeve 2 and a guide piece 3 pushed into said bearing sleeve. The bearing sleeve 2 is pushed into the bottom open end of a base tube 4 of a sick bed (not illustrated). A fastening screw 5 penetrates the base tube 4 and the bearing sleeve 2 and is screwed into the guide piece 3. Bearing sleeve 2 and guide piece 3 are also fixed into position opposite one another by means of a pin 6.

A swivel bearing 7, designed as a ball bearing, is arranged coaxially on the bottom end of the guide piece 3. A swivel arm 8 is mounted by means of this swivel bearing 7 at this guide piece 3 so as to be swiveable around the longitudinal axis of the fastening pin 1. The swivel arm 8 and the swivel bearing 7 are covered jointly upward by a cover plate 9.

A wheel carrier 10 is mounted on a swivel arm 8 so as to swivel around a flexible axle 11. The wheel carrier 10 bears on each side an axle journal 12, 12', on each of which a wheel 13, 13' can be rotated with its hub 14, 14'. The two wheels 13, 13' are arranged parallel and at a distance from one another.

A central spring housing 15 is designed at the swivel arm 8. The wheel carrier 10 has on its free end a bearing pin 16, which extends parallel to the flexible axle 11. On this bearing pin 16 a spring bracket 17 can be tilted whose upper side is designed as a spring washer 18. A guide cylinder 19 extends upwards from the upper side of the spring bracket 17 coaxially to the spring washer 18. A wheel spring 20, which is designed as a spiral spring, is braced with its upper end against the upper side of the spring housing 15 and rests with its bottom end on the spring washer 18 of the spring bracket 17, thus enclosing the guide cylinder 19 concentrically.

A hexagonal locking bolt 21 is guided coaxially to the fastening pin 1 in an axial bore 22, which also has a hexagonal cross section, so as to be stationary in the guide piece 3 yet axially movable. At its upper end the locking bolt 21 bears a head plate 23, which has a round cross section and whose diameter is somewhat larger than that of the locking bolt 21. In the bearing sleeve 2 is designed a cylindrical recess 24 in which the upper end of the locking bolt 21 projects with its head plate 23. A lift spring 25, which endeavors to push the locking bolt 21 downward, is clamped between the bottom side of the head plate 23, projecting laterally over the locking bolt 21, and the bottom of the receiving space 24, which simultaneously represents the upper side of the guide piece 3.

The recess 24 extends upward into a receiving space 26, which is also designed within the bearing sleeve 2. In this receiving space, an eccentric disk 27 can be rotated vertically to the longitudinal axis of the locking bolt 21. The eccentric disk 27 has on its periphery three bearing regions 28, 29, and 30 with graduated diameters. A twisting of the eccentric disk 27 brings one of these bearing regions 28, 29 or 30 into contact with a pressure piece 31, which can be moved axially in the recess 24. An elastic compressible intermediate element 32 is arranged between pressure piece 31 and the upper side of the head plate 23 of the locking bolt 21. A twisting of the eccentric disk 27 moves the locking bolt 21 against the action of the lift spring 25 step by step downward.

A brake lever 33 can be tilted in the wheel carrier 10. The axis of tilt 34 of the brake lever 33 is arranged approximately in the center between the bearing axis of the locking bolt 21 and the axis of rotation of the wheel 13. The brake lever 33 is designed as a two-armed lever on whose one end the locking bolt 21 which tapers off toward the bottom stands erect and whose other end bears a brake member 35. The wheel 13 bears a brake rim 36, which interacts with the brake member 35 and which is arranged coaxially around its hub 14.

The flexible axle 11 of the wheel carrier 10 runs parallel to the axis of rotation of the wheels 13, 13' and intersects the longitudinal axis of the locking bolt 21. In this design the flexible axle 11 intersects the contact point between the bottom end of the locking bolt 21 and the brake lever 33. If the wheel carrier 10 is loaded subject to the compression of the wheel spring 20 relative to the swivel arm 8 or the spring housing 15, it has no influence on the vertical position of the contact point between the locking bolt 21 and the brake lever 33. The axial path, which the locking bolt 21 must travel downward, in order to mesh the brake member 35 with the brake rim 36 by means of the brake lever 33, is, thus, always constant regardless of whether and how far the wheel carrier 10 is swivelled vertically with respect to the swivel bearing 7.

On a rotationally symmetrical part of the swivel arm 8 a toothed rim 37a is designed coaxially to the longitudinal axis of the fastening pin 1 or the locking bolt 21. A locking disk 38a can be connected to the locking bolt 21 so as to be stationary yet axially movable. The bottom side of the locking disk 38 is provided with a toothing 39a. Subject to the action of a locking spring 40a, the locking disk 38a with its toothing 39a can be meshed with the toothed rim 37a at the swivel arm 38. Furthermore, a stop rim, whose diameter is greater than that of the toothed rim 37a, is designed on the swivel arm 8 above the toothed rim 37a. Furthermore, a stop disk 42a, which has on its bottom side notches 43a and whose diameter is greater than that of the locking disk 38a, is connected to the locking bolt 21 so as to be stationary yet axially movable. This stop disk 42a can be meshed with the stop rim 41a subject to the action of a stop spring 44a. The spring force of the stop spring 44a is greater than that of the locking spring 40a, which is arranged between the upper side of the locking disk 38a and the bottom side of the stop disk 42a. A cam plate 45 is mounted stationarily at the locking bolt 21 below the locking disk 38a. This cam plate 45 comes to rest on the bottom side of the locking disk 38a when the locking bolt 21 moves upward.

If at this stage the locking bolt 21 is moved axially downward out of its upper resting position by twisting the eccentric disk 27 to a limited degree clockwise, the upper of the two disks, the stop disk 42a rests on the stop rim 41a, designed on the swivel arm 8. If at the same time the notches 43a, provided at a 180° angle on the stop disk 42a, make contact with the related stops of the stop rim 41a, the swivel arm is locked, subject to the action of the stop spring 44a, in a 180° position, which corresponds to the straight ahead position of the wheels 13, 13'. If the notches 43a do not strike the corresponding stops of the stop rim 4a, in this axial position of the locking bolt 21 the swivel arm 8 will swivel out with respect to the fastening pin 1 only so far until the stop disk 42a locks in the stop rim 41, subject to the action of the stop spring 44a.

Further twisting of the eccentric disk 27 moves the locking bolt 21 further downward into a deeper recessed position in which the cam plate 45, previously adjoining the bottom side of the locking disk 38a, distances itself from said locking disk. If the locking spring 40a that has been compressed up to that point is released, the toothing 39a meshes at the bottom side of the locking disk 38a with the toothed rim 37a at the swivel arm 8. This leads to a total locking of the swivel arm 8 with respect to the fastening pin 1, regardless of the momentary angle.

If the eccentric disk 27 is twisted even further, the bearing region 30 having the smallest diameter comes finally to rest on the pressure piece 31. The locking bolt 21 moves in this manner into its lowest axial position and pushes by means of the brake lever 33 the brake member 35, sitting thereon, against the brake rim 36 on the hub 14 of the wheel 13. In this bottom end position of the locking bolt 21, not only the swivel arm 8 is locked with respect to the fastening pin 1 and, thus also with respect to the base tube 4, but also the wheel 13 is simultaneously locked.

The locking bolt 21 returns gradually into its uppermost axial position by turning back the eccentric disk 27 counterclockwise, subject to the action of the lift spring 25. To this end, first the blocking of the wheel 13 is released. Then the cam plate 45 lifts first the bottom locking disk 38a and then the stop disk 42a arranged above it from the toothed rim 34a or the stop rim 41a, ab, thus restoring the swivelability of the swivel arm 8 with respect to the fastening pin 1.

In an alternative embodiment of the caster wheel, which is also the caster wheel shown in FIGS. 1 and 2, the function of the two disks arranged coaxial around the locking bolt 21 is exchanged so that the bottom disk is designed as the stop disk 38b and the upper disk as the locking disk 42b. The condition for said exchange is, of course, that the upper locking disk 42b is not only stationary but also fastened unmovable in the axial direction with the locking bolt, for example, by means of a crossbolt (not illustrated) or an additional cam plate. Even in this design the swivel arm 8 is locked into the straight ahead position of the wheels 13, 13' when the locking bolt 21 is moved downward and then, when lowered further, the swivelling motion is totally locked independent of the momentary angular position in which the swivel arm 8 or the wheels 13, 13' are standing at the moment with respect to the fastening pin 1 or the base tube 4.

The upper side of the stop disk 42a, 38b or the locking disk 38a, 42b is designed as a spring washer to receive the stop spring 44a or the locking spring 44b. The bottom side of the stop disk 38b, 42a or the locking disk 38a, 42b has a ring groove 46, which centers the locking spring 40a, 44b or the stop spring 40b or 44a.

Figure 3:
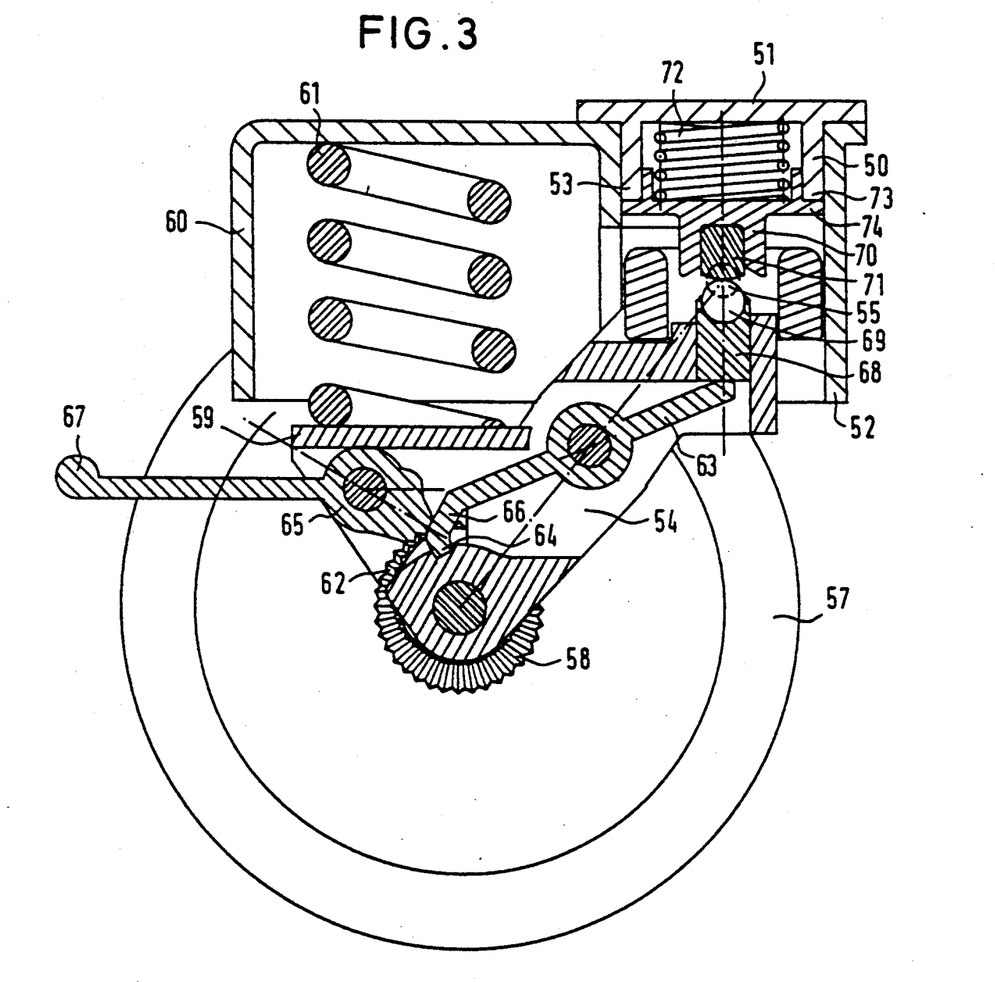
FIG. 3 is a vertical section of a second embodiment of a lockable caster wheel.
Figure 4:
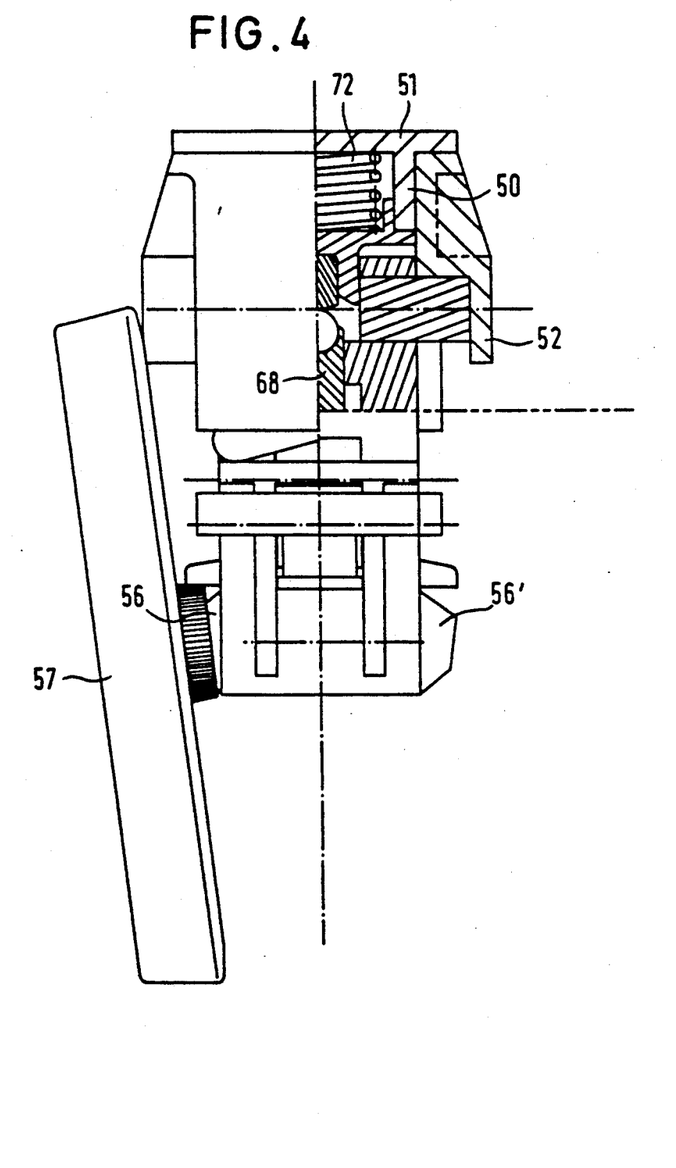
FIG. 4 shows on the right a vertical section of the caster wheel of FIG. 3 and on the left a front view.

FIGS. 3 and 4 show an alternative design of a lockable caster wheel that is simpler to construct. A cylindrically designed fastening pin 50 bears on its upper side a mounting plate 51 with which the caster wheel can be mounted, for example, on the bottom side of a hospital bed (not illustrated). A swivel arm 52 can be swivelled around the longitudinal axis of the fastening pin 50 in a swivel bearing 53 designed here as a friction bearing. At the swivel arm 52 a wheel carrier 54 can be swung around the swivel axis 55. Two axle journals 56, 56' are designed on the side at the wheel carrier 54, on each of said journals a wheel 57 with its hub 58 being rotatable. The wheel 57 is tilted so that it runs with a negative camber.

The wheel carrier is designed as a one-armed lever. A spring washer 59 is designed on its free end. The swivel arm 52 encloses a spring housing 60. A wheel spring 61 designed as a spiral spring is arranged between the spring housing 60 and the spring washer 59 and cushions the swivelling motion of the wheel carrier 54 around its flexible axle 55 with respect to the swivel arm 52 or the spring housing 60. At the same time the flexible axle runs parallel to the axis of rotation of the wheel 57.

The wheel 57 bears a brake rim 62 arranged coaxially around its hub 58. At the wheel carrier 54, the brake lever 63, designed as a two-armed lever, can be tilted around an axis parallel to the flexible axis 55. At its one end the brake lever 63 bears a brake member 64, which interacts with the brake rim 62. Furthermore, at the wheel carrier 54 a rotary eccentric 65 can be rotated parallel to the axis of tilt of the brake lever 63. The rotary eccentric 65 acts on the brake lever 63 in the vicinity of the brake member 64 and pivots it during rotation in such a manner that the brake member 64 engages with the brake rim 62. At the same time the rotary eccentric slides on the upper side of the brake lever 63 in the region of a shoulder 66. For actuation, the rotary eccentric 65 is connected to a foot lever 67.

A cylindrical locking bolt 68 can be moved axially within the swivel arm 52. The locking bolt 68 bears on its upper end a round pressure piece 69. A receptacle 70 is designed in the upper part of the swivel arm 52. An elastic intermediate element 71 is arranged between this receptacle 70 and the pressure piece 69.

The swivel arm 52 can be swivelled not only horizontally but also vertically with respect to the fastening pin 50. Within the hollow fastening pin 50, a lift spring 72 is arranged between the bottom side of the mounting plate 51 and the upper side of the swivel arm 52. A toothed ring 73 is provided on the bottom end of the fastening pin 50. The opposing upper end of the swivel arm 52 bears a counter toothing 74, which can mesh with the toothed ring 73 against the action of the lift spring 72.

FIG. 3 shows the foot lever 67 in a horizontal position in which not only the swivelling motion of the swivel arm 52 with respect to the fastening pin 50 is locked but also the rotation of the wheel 57 is blocked. In this position the rotary eccentric 65 pushes the brake member 64 against the brake rim 62. At the same time the locking bolt 68 is held in its upper end position by means of the end that is opposite the brake member 64 and belongs to the brake lever 63. The counter toothing 74 of the swivel arm 52 engages with the toothed ring 73 of the fastening pin 50 via the pressure piece 69 and the elastically compressed intermediate element 71.

If the foot lever 67 is swivelled upward, it is connected clockwise to a twisting of the rotary eccentric 65. Subject to the action of the lift spring 72, the locking bolt 68 and the swivel arm 52 move axially downward so that the toothed ring 73 and the counter toothing 74 are disengaged. Thus, the swivelability of the swivel arm 52 is restored. At the same time the brake lever 63 is also swivelled clockwise, thus lifting the brake member 64 from the brake rim 72. Thus, the blocking of the wheel 57 is also suspended.

I claim:

1. Lockable caster wheel, in particular for movable hospital beds, with
   a fastening pin (1, 50);
   a swivel arm (8, 52) adapted to be swivelled around the fastening pin (1, 50) in a swivel bearing (7, 53);
   a mechanism for fixing the swivelling motion of the swivel arm (8, 52);
   at least one rotatable wheel (13, 13'; 57),
   a tiltable brake lever (33, 63) to block the rotation of the wheel (13, 13'; 57); and
   a locking bolt (21, 68) arranged coaxially to the fastening pin (1, 50) and movable relative to said pin in the axial direction against the action of a lift spring (25, 72) for lockins the swivel arm (8, 52) as a function of its axial position and blocking rotation of the wheel (13, 13'; 57) by means of engagement with the brake lever (33, 63);
   wherein:
   a wheel carrier (10, 54), which carries the wheel (13, 13'; 57) is pivoted on the swivel arm (8, 52),
   a flexible axle (11, 55) of the wheel carrier (10, 54) extends essentially parallel to the axis of rotation of the wheel (13, 13'; 57) and intersects the longitudinal axis of the locking bolt (21, 68);
   the brake lever (33, 68) is mounted in the wheel carrier (10, 54);
   an axis of tilt (34) of the brake lever (33, 63) is parallel to the flexible axle (11, 55) of the wheel carrier (10, 54); and
   the wheel carrier (10, 54) is resiliently biased relative to the swivel arm (8, 52) by means of a wheel spring (20, 61).

2. Lockable caster wheel, as claimed in claim 1, wherein
   the wheel (13, 13'; 57) carries a brake rim (36, 62) that is arranged coaxially around its hub (14, 14'; 58); and
   the brake lever (33, 63) is a two-armed lever having one end carrying a brake member (33, 64) that interacts with the brake rim (36, 62) and another end which interacts with the bottom end of the locking bolt (21, 68).

3. Lockable caster wheel, as claimed in claim 2, wherein the wheel carrier (10, 54) has at least one axle journal (12, 12'; 56, 56') to receive the hub (14, 14'; 58) of at least one wheel (13, 13'; 57).

4. Lockable caster wheel, as claimed in claim 3, wherein the wheel carrier (10, 54) bears two wheels (13, 13'; 57) spaced at short intervals from one another.

5. Lockable caster wheel, as claimed in claim 4, wherein the axes of rotation of the two wheels (57) are tilted downward forming an acute angle.

6. Lockable caster wheel, as claimed in claim 1, wherein the wheel spring (20, 61) is designed as a spiral, leaf or a torsion-bar spring.

7. Lockable caster wheel, as claimed in claim 1, wherein the swivel arm (8, 52) has a spring housing (15, 60), which accommodates the wheel spring (20, 61).

8. Lockable caster wheel, as claimed in claim 6, wherein
   the wheel carrier (10, 54) is designed as a one-armed lever;
   the free end of the wheel carrier (10, 54) has a spring washer (18, 59) to receive the bottom end of the wheel spring (20, 61); and
   the axis of rotation of the wheel (13, 13'; 57) lies between the flexible axle (11, 55) and the wheel spring (20, 61).

9. Lockable caster wheel, as claimed in claim 8, wherein
   the wheel carrier (10) has a journal pin (16), which extends parallel to the flexible axle (11) of the wheel carrier (10);
   a spring bracket (17) can be tilted on the journal pin (16); and
   the spring washer (18) is designed on the upper side of said spring bracket (17).

10. Lockable caster wheel, as claimed in claim 9, wherein the spring bracket (17) has a guide cylinder (19) for the wheel spring (20).

11. Lockable caster wheel, as claimed in claim 1, wherein
    the locking bolt (21) has a multi-edged cross section;
    the fastening pin (1) has an axial bore (22) corresponding to the cross section in which the locking bolt (21) is guided stationarily;
    a toothed rim (37a, 41b) is designed at the swivel arm (8);
    a locking disk (38a, 42b), which has a toothing (39a, 43b) on its bottom side, is connected stationarily to the locking bolt (21);
    this locking disk (38a, 42b) meshes with the toothed rim (37a, 41b), subject to the action of the locking spring (40a, 44b), in order to thus lock the swivelling motion of the swivel arm (8) around the fastening pin (1); and
    the locking bolt (21) bears a cam plate (45), which lifts the locking disk (38a, 42b) upward from the toothed rim (37a, 41b) when the locking bolt (21) is moved axially.

12. Lockable caster wheel, as claimed in claim 11, wherein
    the locking disk (38a) can be moved axially with respect to the locking bolt (21);
    at the swivel arm (8) above the toothed rim (37a) a stop rim (41a) is designed whose diameter is greater than that of the toothed rim (37a);
    a stop disk (42) is connected stationarily to yet axially movable with the locking bolt (21) above the locking disk, and said locking disk has notches (43a) on its bottom side and a diameter greater than that of the locking disk (38a);
    this stop disk (42a) can mesh with the stop rim (41a), subject to the action of a stop spring (44a), in order to thus lock the swivel arm (8) with the fastening pin (1) in the straight ahead position of the wheel (13);
    the locking spring (40a) is arranged between the upper side of the locking disk (38a) and the bottom side of the stop disk (42a);
    the spring force of the stop spring (44a) is greater than that of the locking spring (44b).

13. Lockable caster wheel, as claimed in claim 11, wherein
    the locking disk (42a) is connected firmly to the locking bolt (21);

at the swivel arm (8) below the toothed rim (41a) a stop rim (37b) is located whose diameter is less than that of the toothed rim;

a stop disk (38b) is connected stationarily yet axially movable to the locking bolt (21) below the locking disk (42b), and that said locking disk has notches (39b) on its bottom side and whose diameter is smaller than that of the locking disk (42b);

this stop disk (38b) can mesh with the stop rim (37b), subject to the action of a stop spring (40b), in order to thus lock the swivel arm (8) with the fastening pin (1) in the straight ahead position of the wheel (13); and the stop spring (40b) is arranged between the upper side of the stop disk (38b) and the bottom side of the locking disk (42b).

14. Lockable caster wheel, as claimed in claim 12, wherein the upper side of the stop disk (42a, 38b) or the upper side of the locking disk (38a, 42b) is designed as the spring washer to receive the stop spring (44a, 40b) or the locking spring (40a, 44b).

15. Lockable caster wheel, as claimed in claim 14, wherein the bottom side of the stop disk (42a, 38b) or locking disk (38a 42b) has a ring groove (46) to center the locking spring (40a, 44b) or the stop spring (44a, 40b).

16. Lockable caster wheel, as claimed in claim 11, wherein a receiving space (26) is designed in the upper part of the fastening pin (1);

in this receiving space (26) an eccentric disk (27) can be rotated vertically to the longitudinal axis of the locking bolt (21); and a twisting of the eccentric disk (27) moves the locking bolt (21) out of its upper resting position axially downward.

17. Lockable caster wheel, as claimed in claim 16, wherein in the fastening pin (1) a cylindrical recess (24), which extends into the receiving space (26), is located around the upper end of the locking bolt (21);

the eccentric disk (27) acts on a pressure piece (31), which is moved axially in the recess (24);

the locking bolt (21) bears a head plate (23) on its upper end; and an elastic intermediate element (32) is arranged between the pressure piece (31) and the head plate (23).

18. Lockable caster wheel, as claimed in claim 16, wherein the eccentric disk (27) exhibits on its periphery three bearing regions (28, 29, 30) for three defined axial positions of the locking bolt (21).

19. Lockable caster wheel, as claimed in claim 17, wherein the lift spring (25) encloses the locking bolt (21) concentrically and is clamped between the bottom side of the head plate (23) and the bottom of the recess (24).

20. Lockable caster wheel, as claimed in claim 16, wherein the fastening pin (1) comprises a one-piece bearing sleeve (2), which contains the eccentric disk (27), and a guide piece (3) in which the locking bolt (21) is guided.

21. Lockable caster wheel, as claimed in claim 20, wherein the bearing sleeve (2) can be pushed into a base tube (4) of the movable bed; and bearing sleeve (2), guide piece (3) and base tube (4) can be held in position by a fastening screw (5).

22. Lockable caster wheel, as claimed in claim 1, wherein the swivel arm (52) can be moved axially with respect to the fastening pin (50);

the lift spring (72) is arranged between the fastening pin (50) and the swivel arm (52);

a toothed ring (73) is provided on the bottom end of the fastening pin (50);

the upper end of the swivel arm (52) bears a counter toothing (74), which meshes with the toothed ring (73) against the action of the lift spring (72), in order to thus lock the swivel motion of the swivel arm (52) around the fastening pin (50); and the locking bolt (68) is arranged within the swivel arm (52).

23. Lockable caster wheel, as claimed in claim 22, wherein the wheel (57) bears a brake rim (62), arranged coaxially around its hub (58);

the brake lever (63) is designed as a two-armed lever, whose one end bears a brake member (64) interacting with the brake rim (62) and whose other end interacts with the bottom end of the locking bolt (68);

a rotary eccentric (65) can be rotated at the wheel carrier (54) parallel to the axis of tilt of the brake lever (63); and this rotary eccentric (65) acts on the brake lever (63) in the vicinity of the brake member (64).

24. Lockable caster wheel, as claimed in claim 23, wherein the brake lever (63) has a shoulder (66) in the region of its end bearing the brake member (64).

25. Lockable caster wheel, as claimed in claim 23, wherein the rotary eccentric (65) is connected to a foot lever (67).

26. Lockable caster wheel, as claimed in claim 23, wherein the locking bolt (68) can be moved axially within the swivel arm (52) and is subject to the action of an elastic intermediate element (71).

27. Lockable caster wheel, as claimed in claim 26, wherein a receptacle (70) for the upper end of the locking bolt (68) is designed in the interior of the swivel arm (52); and the elastic intermediate element is arranged between the receptacle (70) and the locking bolt (68).

* * * * *